(12) United States Patent
Kotulic, Jr.

(10) Patent No.: US 10,538,876 B1
(45) Date of Patent: *Jan. 21, 2020

(54) LAUNDRY COLLAR WITH CLIP

(71) Applicant: Wayne Kotulic, Jr., Indianapolis, IN (US)

(72) Inventor: Wayne Kotulic, Jr., Indianapolis, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/352,023

(22) Filed: Nov. 15, 2016

Related U.S. Application Data

(63) Continuation of application No. 14/302,107, filed on Jun. 11, 2014, now Pat. No. 9,493,907.

(60) Provisional application No. 61/833,677, filed on Jun. 11, 2013.

(51) Int. Cl.
*D06F 95/00* (2006.01)
*F16B 2/08* (2006.01)
*F16B 2/10* (2006.01)
*F16B 2/00* (2006.01)

(52) U.S. Cl.
CPC ............ *D06F 95/008* (2013.01); *F16B 2/005* (2013.01); *F16B 2/08* (2013.01); *F16B 2/10* (2013.01)

(58) Field of Classification Search
CPC ......... D06F 95/008; D06F 93/005; A41F 9/00
See application file for complete search history.

(56) References Cited

U.S. PATENT DOCUMENTS

| | | | |
|---|---|---|---|
| 452,830 A | 5/1891 | Bowie et al. | |
| 603,538 A * | 5/1898 | Pettibone | A45F 5/02 224/268 |
| 2,879,990 A | 3/1959 | Eaton | |
| 2,953,828 A | 9/1960 | Hochman | |
| 3,486,672 A | 12/1969 | Esopi | |
| 3,881,228 A * | 5/1975 | Takabayashi | A44B 99/00 16/260 |
| 4,086,686 A * | 5/1978 | Takabayashi | A41F 3/02 16/DIG. 13 |
| 4,494,264 A | 1/1985 | Wattiez et al. | |
| 4,662,016 A * | 5/1987 | Seeman | A47C 21/022 24/72.5 |
| 5,388,313 A * | 2/1995 | Cameron | A41F 3/04 24/265 EC |
| 5,440,791 A * | 8/1995 | Guio | A44B 99/00 24/543 |
| 5,460,347 A * | 10/1995 | Schacher | B25H 3/00 211/26.1 |
| 5,551,128 A * | 9/1996 | Townsend | D06F 95/008 24/302 |

(Continued)

OTHER PUBLICATIONS

Cleaner's Supply Plastic Net Clips—Quick Close, [online] © 2011, [retrieved Feb. 5, 2013]. Retrieved from the Internet: www.cleanersupply.com/products/product.dfm/pid/5369/Plastic-Net-Clips-Quick-Close 1 pg.

(Continued)

*Primary Examiner* — Gary C Hoge

(74) *Attorney, Agent, or Firm* — William F. Bahret

(57) ABSTRACT

A laundry collar having a strap and a fastener that releasably interconnects the opposing strap ends, and a locking clip attached to one end of the strap and having opposing jaws which each have a plurality of teeth. A means for locking the jaws closed around an article of clothing secures the article to the laundry collar.

18 Claims, 4 Drawing Sheets

(56) References Cited

U.S. PATENT DOCUMENTS

| | | | |
|---|---|---|---|
| 5,611,118 A | 3/1997 | Bibbee | |
| 5,697,128 A | 12/1997 | Peregrine | |
| 5,711,032 A | 1/1998 | Carpenter | |
| 5,809,814 A | 9/1998 | Cons | |
| 6,038,748 A * | 3/2000 | Durney | D06F 95/008 24/115 G |
| 6,056,173 A * | 5/2000 | Gillespie | A45C 13/30 224/194 |
| 6,196,931 B1 * | 3/2001 | Wilt | A63B 69/0059 473/207 |
| 6,389,657 B1 | 5/2002 | Turner | |
| 6,478,464 B1 | 11/2002 | Miller | |
| 6,749,099 B2 | 6/2004 | Danielson | |
| D504,576 S | 5/2005 | Strollo | |
| 6,990,694 B2 | 1/2006 | Poole | |
| 7,195,529 B1 | 3/2007 | Crandall | |
| 7,225,507 B2 * | 6/2007 | Anderson | D06F 95/008 24/329 |
| 7,275,868 B2 | 10/2007 | Miller | |
| 7,357,284 B2 | 4/2008 | Jauvin | |
| 8,365,361 B1 | 2/2013 | Ahern | |
| 2001/0052145 A1 * | 12/2001 | Srivastava | A41F 1/00 2/312 |
| 2003/0231810 A1 | 12/2003 | Durney et al. | |
| 2016/0376745 A1 | 12/2016 | Durney et al. | |
| 2017/0009394 A1 | 1/2017 | Durney et al. | |

OTHER PUBLICATIONS

Laundry Helpers, [online], undated, [retrieved Jan. 30, 2013]. Retrieved from the Internet: www.laundryhelpers.com 1 pg.

* cited by examiner

LAUNDRY COLLAR WITH CLIP

CROSS-REFERENCE TO RELATED APPLICATION

This application is a continuation of application Ser. No. 14/302,107, filed Jun. 11, 2014, now U.S. Pat. No. 9,493,907, issued Nov. 15, 2016, which claims the benefit of U.S. Provisional Patent Application No. 61/833,677, filed Jun. 11, 2013, which applications and patent are hereby incorporated by reference.

BACKGROUND OF THE INVENTION

This invention relates to loop-type laundry holders having a strap or belt with a buckle fastener for holding garments together such as in a sports team laundry environment in which athletic uniforms and the like for a number of players are laundered together but are desirably kept organized such that each player's garments can be readily separated from the rest.

Various such laundry holders have been created in the past, such as disclosed in U.S. Pat. No. 6,038,748 to Durney et al., and U.S. Pat. No. 6,478,464 to Miller, both of which patents are hereby incorporated by reference. However, a need remains for improvements in the art. The above-referenced Miller patent discusses some of the drawbacks of the prior art including drawbacks of the Durney laundry holder, but proposes a solution that is more complicated than necessary and has its own drawbacks in that it adds a mesh bag for retaining articles of clothing, such as socks, that do not have openings for the passage of a strap that is useful for holding shirts, shorts and the like.

SUMMARY OF THE INVENTION

One aspect of the invention involves a laundry collar with a strap having opposing ends and a fastener for releasably interconnecting the strap ends, and a locking clip attached on one end of the strap. The clip has opposing jaws, with each jaw having a plurality of teeth. A means for locking the jaws closed around an article of clothing secures the article to the laundry collar.

Another aspect of the invention involves a laundry collar with a strap having opposing ends and a fastener for releasably connecting the ends, and clip attached on one end to the strap, the clip having first and second articulated arms each having a generally planar body portion and defining an array of discrete frictional contact points extending away from the body portion toward the other arm. The arms are movable from an open clip position to a closed clip position in which a sock placed between the arms is securely frictionally retained by the frictional contact points.

A further aspect of the invention involves a laundry collar having a strap with opposing ends and a fastener for releasably connecting the ends, and a clip attached to the strap, the clip having an upper articulated arm with first and second rows of teeth that are spaced apart, defining an upper cavity therebetween. The clip also has a lower articulated arm with third and fourth rows of teeth that are spaced apart, defining a lower cavity therebetween. The arms are movable from an open clip position to a closed clip position, whereby a portion of a sock placed within the cavities may be stressed differentially from other portions of the sock outside the clip and frictionally retained by the rows of teeth.

The objects and advantages of the present invention will be more apparent from the following detailed description when taken in conjunction with the accompanying drawings.

DETAILED DESCRIPTION OF PREFERRED EMBODIMENTS

Figure 1:
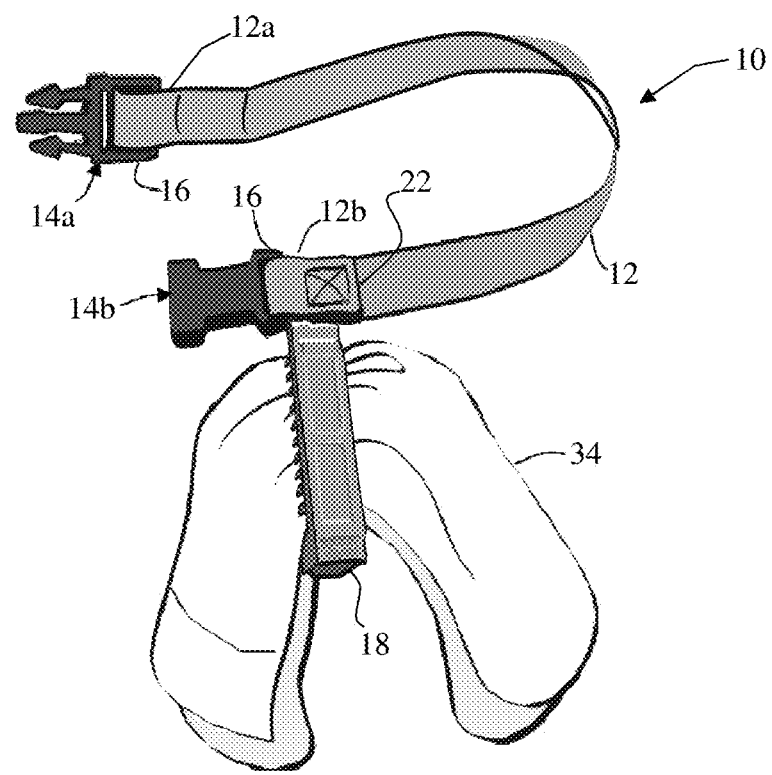
FIG. 1 is a drawing of one embodiment of a laundry collar or holder according to the present invention with an alligator clip holding a pair of athletic socks.
Figure 2:
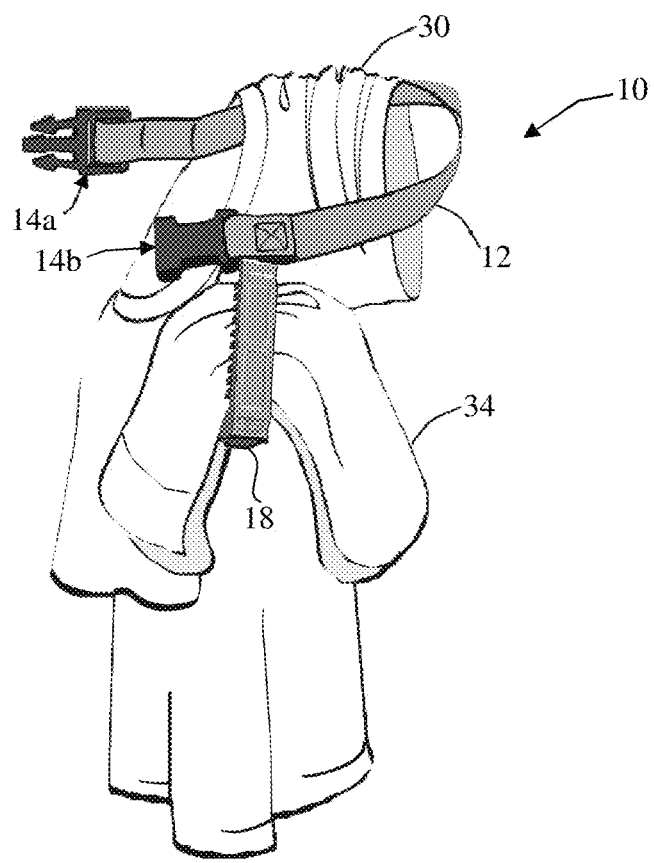
FIG. 2 is a drawing of the laundry collar of FIG. 1 additionally holding a shirt.
Figure 3:
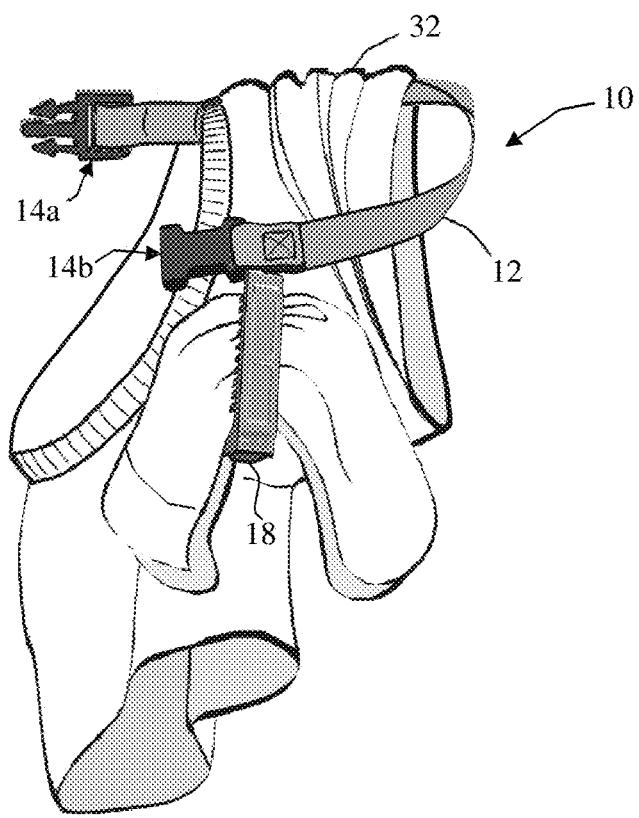
FIG. 3 is a drawing of the laundry collar of FIG. 1 additionally holding a pair of shorts.
Figure 4:
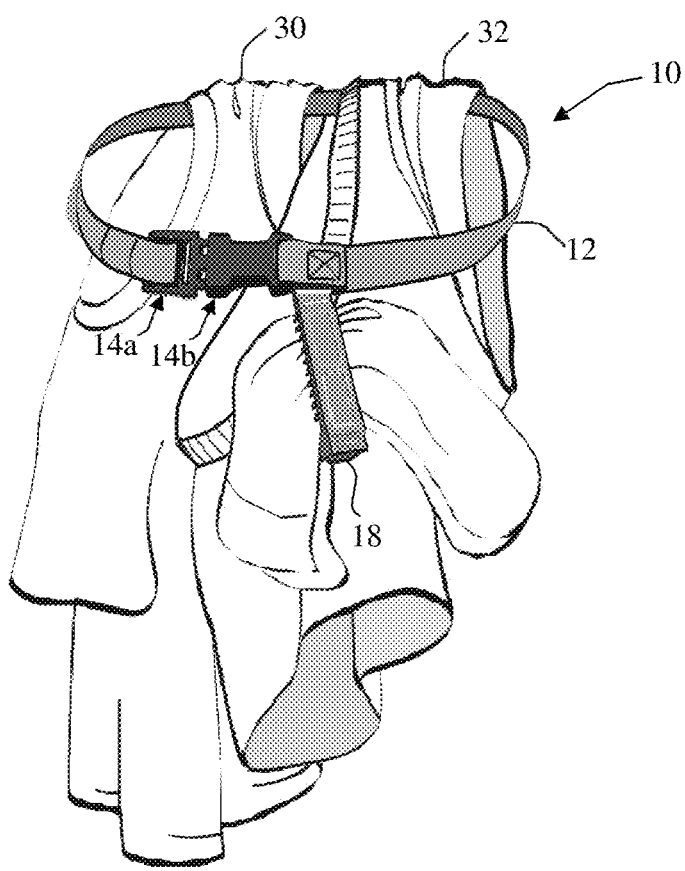
FIG. 4 is a drawing of the laundry collar of FIG. 1 with the buckle engaged and the socks, shirt and shorts thereby secured together for washing and drying.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Referring to FIGS. 1-4, one embodiment of a laundry collar or holder 10 according to the present invention comprises a flexible strap 12, constructed from a length of nylon or polypropylene webbing, secured on each end to one half of a side-release buckle fastener 14. More specifically, one end 12a of the strap is secured to the male part 14a of the buckle and the opposite end 12b of the strap is secured to the mating female part 14b of the buckle. In each case, the end of the strap is threaded through an attachment loop 16 of the buckle and then looped or folded back on itself and sewn together in a conventional manner to define a loop to secure the strap to the associated buckle half. The strap and buckle may both be approximately 1" in width. The finished length of the strap in the disclosed embodiment is approximately 16" from one buckle half to the other.

A locking plastic fastener 18 with teeth, sometimes called an alligator clip, is attached to one end of the strap, in this embodiment the end adjacent the female buckle half. The type of teeth may vary within the scope of the present invention. Each tooth may be smooth or serrated, including partly serrated, and adjacent teeth may adjoin each other or have space between them as shown in FIGS. 5 through 8. The teeth in the preferred embodiment provide one form of multiple discrete, substantially non-piercing frictional contact points with a sock or other article of clothing desired to be held by fastener 18. A tooth structure that pierces an article of clothing may be useful in certain applications but is less preferred.

Figure 5:
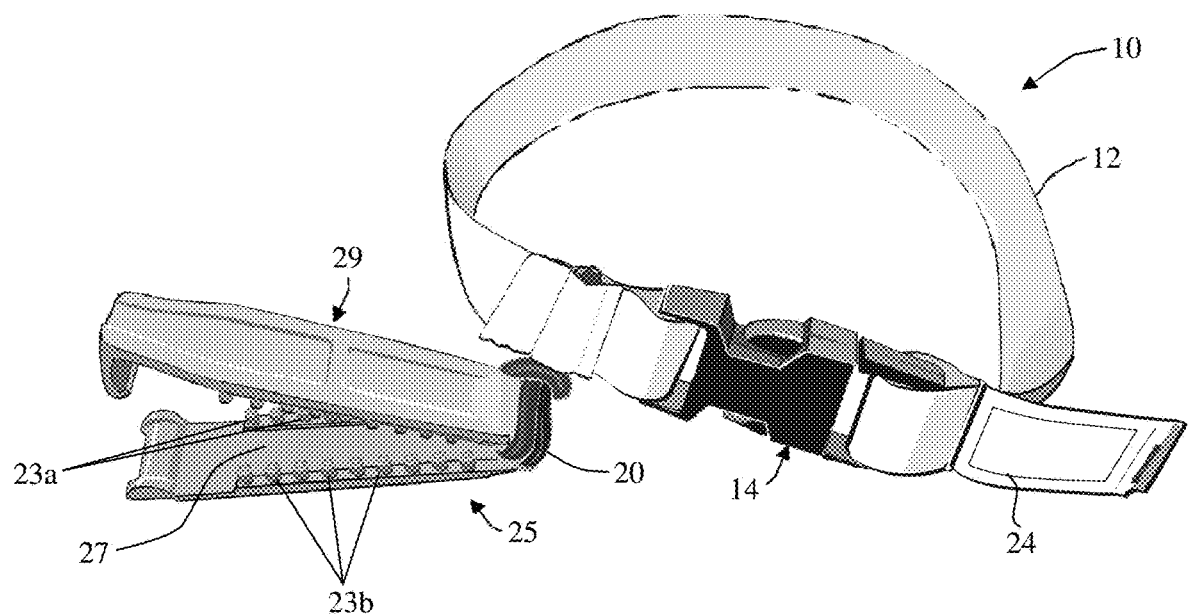
FIG. 5 shows a modification of the embodiment of FIG. 1 having a label adjacent to the buckle, and showing the alligator clip in an open position.
Figure 6:
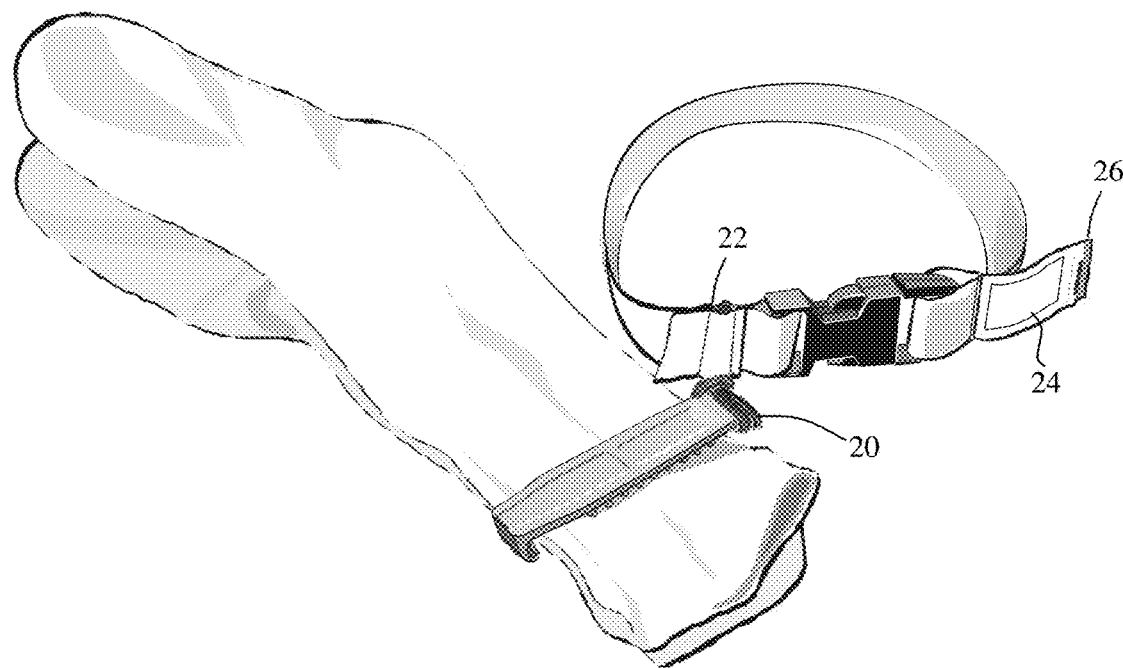
FIG. 6 shows the laundry collar of FIG. 5 holding a pair of athletic socks in the alligator clip.
Figure 7:
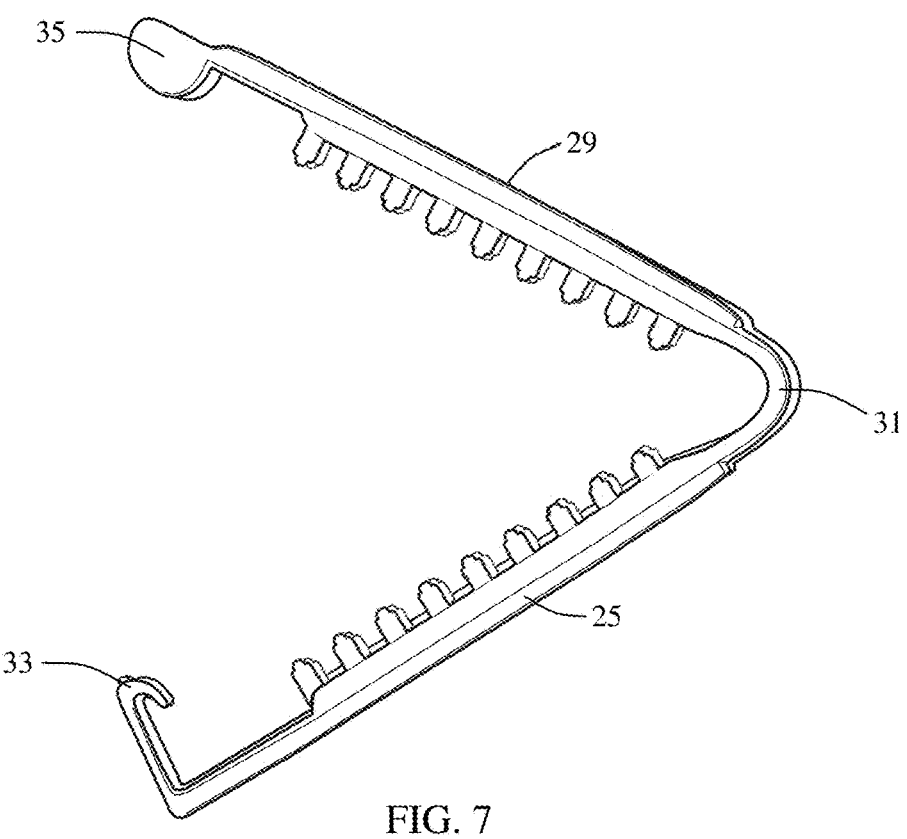
FIG. 7 is a side view of the alligator clip in an open position.

The locking fastener is preferably attached to the strap at a point within 1" of the buckle by means of a secondary nylon cord 20 which may have a cow hitch or lark's head knot formed therein to attach it to the hinge of the clip, as perhaps best shown in FIG. 5. The free ends of the secondary cord are contained within a folded-over portion 22 of the strap, as best shown in FIGS. 5 and 6, and are secured therein by sewing and/or adhesive, for example. If desired, the tips of the free ends may be enlarged by melting in order to inhibit pull-out from strap end portion 22, which may extend approximately 1" beyond the seam which defines the size of the loop attaching the strap to the female buckle half. One suitable clip is a model NP10 plastic net clip commercially available from Cleaner's Supply Inc., Conklin, N.Y., accessible online at cleanersupply.com. This clip, in its closed position, is approximately 3½" long and has a square cross-section approximately ¾" wide. The clip is preferably capable of holding two pairs of socks securely in an intuitive, user-friendly way. One or more additional clips may be attached to the strap in certain applications of this invention.

Figure 9:
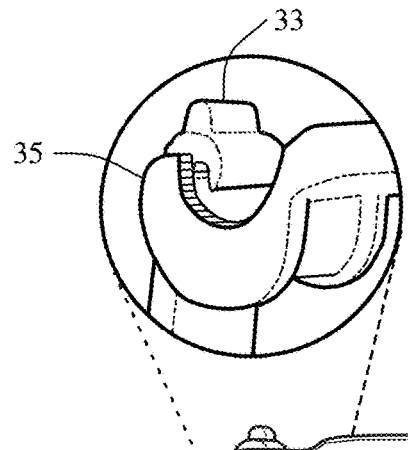
FIG. 9 is an enlarged view showing the hook and catch of the alligator clip.
Figure 8:
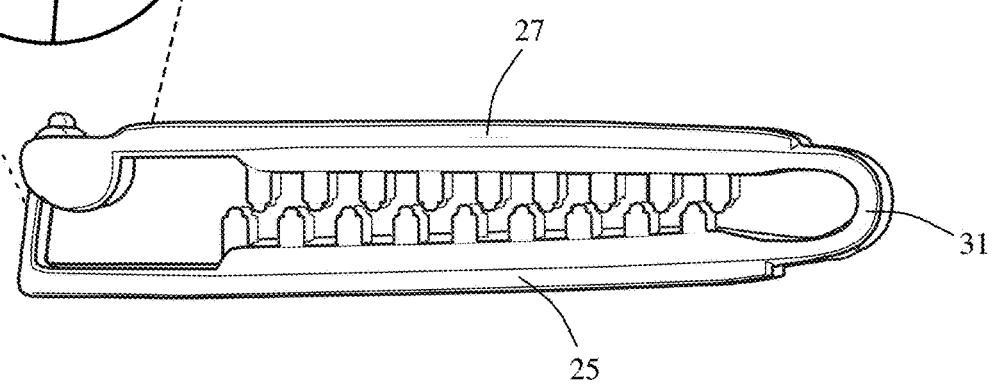
FIG. 8 is a side view of the alligator clip in a closed position.

The clip shown in FIG. 5 has a first row of teeth 23a along one side of lower jaw (or articulated arm) 25 and a second row of teeth 23b along the opposite side, creating a cavity 27 between the rows. Upper jaw 29 has the same features and is joined in one-piece construction to lower jaw 25 through living hinge 31 (see FIG. 7). A clasp, opposite the living hinge, has a hook 33 and a catch 35 that locks (FIGS. 8 and 9) the clip in a closed position when desired. When in a closed position, the teeth of the lower jaw interdigitate with the teeth of the upper jaw, as perhaps best shown in FIG. 8. Alternatively, although less preferred, the upper and lower teeth may be vertically aligned such that there is cusp-to-cusp contact when the clip is closed. Each jaw may have two parallel, straight-line rows of teeth as disclosed, or may have an array of teeth in a different pattern.

The laundry collar may have a label 24 located near the buckle that is suitable for permanent marking such as with a permanent or indelible marker, to allow the user to personalize the collar with personal identification that will not wash off. One example label, shown in FIGS. 5 and 6, is approximately 1¾" long×1" high and is sewn onto a free end 26 of the strap which may extend approximately 1¾" to 2" beyond the seam which defines the size of the loop attaching the strap to the male buckle half. In another embodiment, the label size is approximately 2" long×¾" high.

With the buckle unfastened, one end of the strap is threaded through a garment, for example, a shirt sleeve 30 and/or a pant leg 32, and the buckle is then secured to keep the garments together. The strap may also be utilized for holding girdles, headbands or other garments which have openings through which the strap can be passed. An advantage of the polypropylene webbing is that it does not shrink or curl after repeated washing and drying. Socks 34 are inserted into the open alligator clip and the clip is then snapped closed securing the socks to the laundry collar. When the clip is closed, a portion of the pair of socks is captured within the cross-sectional cavity created by the co-location of the cavities in the lower and upper jaws. This allows the sock material of the captured portion to either be axially tensioned or compressed within the cross-sectional cavity. This relative change in stress on the sock material adjacent the frictional engagement of the rows of teeth of the clip with the socks provides an additional barrier to sock pull-out, augmenting the pull-out barrier provided by the frictional engagement of the teeth with the socks. This improvement provides a simplified answer to the inherent problems associated with laundry straps and cords cited in the Miller patent, while not overcomplicating things by resorting to mesh bags, which their own inherent problems, also cited in the Miller patent. The webbing and the clip, which is preferably made of heat resistant plastic, are safe inside both washers and dryers.

The new laundry collar holds socks quickly and yet firmly and saves precious time and energy by better facilitating simultaneous laundering of the clothing of numerous individuals without the need to sort through the laundry to find everyone's socks and other garments. The laundry collar with alligator clip is highly advantageous for laundering the uniforms or other garments of high-school sports teams, collegiate sports teams, professional sports teams, military units and more. It makes sports team laundry and other group laundry easier and more organized than with other approaches.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

What is claimed is:

1. A laundry collar, comprising:
a laundry strap having opposing ends;
a fastener for releasably interconnecting said opposing strap ends;
a locking clip configured for locking engagement of a pair of socks and having a single pair of opposing jaws operatively connected by a connecting joint on a joint end of said clip, each jaw having a free end, at least one of said jaws having multiple teeth, said clip attached on its joint end to said strap, said joint end disposed immediately adjacent to said strap, said teeth arranged in a row extending a substantial portion of the length of said clip; and
means for locking said jaws closed around the pair of socks thereby securing the pair of socks to said laundry collar.

2. The laundry collar of claim 1, wherein said opposing jaws both have multiple teeth, and wherein said fastener is a buckle fastener consisting of a male buckle part on one of said opposing strap ends and a female buckle part on the other strap end.

3. The laundry collar of claim 2, wherein said pluralities of teeth interdigitate when said locking clip is closed.

4. The laundry collar of claim 1, wherein said opposing jaws are fixed-length jaws joined in one-piece construction by a living hinge at said joint end of said clip, and wherein said joint end is disposed immediately adjacent to said strap, said clip being at least three inches long and less than one inch wide.

5. The laundry collar of claim 4, wherein said locking means is a hook and a catch.

6. The laundry collar of claim 5, wherein:
said hook is disposed on the free end of one of said opposing jaws on the longitudinal axis thereof; and
said catch is disposed on the free end of the other of said opposing jaws on the longitudinal axis thereof.

7. The laundry collar of claim 6, wherein said locking clip is attached to said strap by a cord and is permanently affixed.

8. A laundry collar, comprising:
a laundry strap having opposing ends;
a fastener for releasably connecting said opposing strap ends; and
a clip attached on one end to said strap, said clip having first and second articulated arms each having a generally planar body portion and a free end opposite said one end, at least one of said arms defining discrete frictional contact points disposed along a substantial portion of the length of the arm and extending away from said body portion toward the other arm, said arms being movable from an open clip position to a closed clip position in which a sock placed between said arms is securely frictionally retained by said frictional contact points.

9. The laundry collar of claim 8, wherein said first and second articulated arms have discrete frictional contact points which interdigitate when said clip is placed in said closed position.

10. The laundry collar of claim 8, wherein said clip is designed to hold a pair of socks securely between said first and second articulated arms, wherein said articulated arms are joined together in one-piece construction by a living hinge at one end thereof and are attached on said hinge end to said strap, and wherein at least one of said arms has first and second rows of teeth spaced apart defining a cavity therebetween within which a portion of the pair of socks may be captured when said clip is closed, whereby the captured portion may be stressed differentially from other portions of the socks outside said clip, and is frictionally retained by said rows of teeth.

11. The laundry collar of claim 10, further comprising a means on the free ends of said articulated arms for locking said articulated arms into said closed position around the pair of socks with the socks lying crosswise between said arms.

12. The laundry collar of claim 11, wherein said means for locking is a hook and catch clasp.

13. The laundry collar of claim 8, wherein said first and second articulated arms are joined together in one-piece construction by a living hinge at one end thereof and are attached on said hinge end to said strap, and wherein said clip is approximately three inches long and approximately ¾" wide.

14. The laundry collar of claim 13, further comprising means on the free ends of said articulated arms for locking said articulated arms into said closed position around the sock with the sock lying crosswise between said arms.

15. The laundry collar of claim 14, wherein said clip is attached to said strap by a cord and is permanently affixed.

16. A method of holding garments such as shirts, shorts and socks together in a group laundry environment, said method comprising:

providing a laundry holder including a strap with opposing ends and a fastener for releasably interconnecting the opposing strap ends, and a sock clip having a single pair of opposing jaws with a connecting joint and with a free end on each jaw, the clip attached to the strap with the joint between the strap and the free end of each jaw;

passing one end of the strap in an open state through a shirt or pair of shorts from one opening therein to another opening;

closing the fastener to secure the shirt or shorts on the strap;

placing at least one sock crosswise between the jaws in an open state, with sock material spanning the majority of the distance between the joint and free ends of the jaws; and closing the jaws to secure the at least one sock to the laundry holder.

17. The method of claim 16, wherein the connecting joint for the jaws is a living hinge.

18. The method of claim 16, wherein the sock clip has a clasp with mating clasp parts on the free ends of the jaws, wherein the clip is configured to hold a pair of socks together between the jaws, and wherein the placing step includes placing a pair of socks crosswise between the jaws.

* * * * *